United States Patent
Latham et al.

(10) Patent No.: US 10,415,641 B2
(45) Date of Patent: Sep. 17, 2019

(54) BEARING ELEMENT AND SLIDING LAYER MATERIAL FOR A BEARING ELEMENT

(71) Applicants: Mahle Engine Systems UK Limited, Warwickshire (GB); Mahle International GmbH, Stuttgart (DE)

(72) Inventors: David Latham, Hitchin (GB); Natalie Phipps, Northampton (GB)

(73) Assignees: Mahle Engine Systems UK Ltd, Rugby (GB); Mahle International GmbH, Stuttgart (DE)

( * ) Notice: Subject to any disclaimer, the term of this patent is extended or adjusted under 35 U.S.C. 154(b) by 0 days.

(21) Appl. No.: 15/322,104

(22) PCT Filed: Jun. 15, 2015

(86) PCT No.: PCT/EP2015/063353
§ 371 (c)(1),
(2) Date: Dec. 23, 2016

(87) PCT Pub. No.: WO2015/197414
PCT Pub. Date: Dec. 30, 2015

(65) Prior Publication Data
US 2017/0138396 A1 May 18, 2017

(30) Foreign Application Priority Data
Jun. 25, 2014 (GB) .................. 1411314.6

(51) Int. Cl.
*F16C 33/20* (2006.01)
*F16C 33/04* (2006.01)
(Continued)

(52) U.S. Cl.
CPC .......... *F16C 33/043* (2013.01); *F16C 33/201* (2013.01); *F16C 33/206* (2013.01);
(Continued)

(58) Field of Classification Search
CPC .... F16C 33/043; F16C 33/122; F16C 33/124; F16C 33/125; F16C 33/201; F16C 33/203;
(Continued)

(56) References Cited

U.S. PATENT DOCUMENTS 5,916,955 A   6/1999   Vereschagin et al.
7,732,642 B1  6/2010   Tan et al.
(Continued)

FOREIGN PATENT DOCUMENTS

CN   102008733 A   4/2011
GB   2497725 A   6/2013
(Continued)

OTHER PUBLICATIONS

GB Search report for GB-1411314.6, dated Dec. 22, 2014.
(Continued)

*Primary Examiner* — Alan B Waits
(74) *Attorney, Agent, or Firm* — Fishman Stewart PLLC

(57) ABSTRACT

A bearing element may include a bearing substrate and a sliding layer of a sliding layer material. The sliding layer material may include a polymeric material and nanodiamonds. The nanodiamonds may also be surface-functionalized nanodiamonds. The bearing element may be suitable for automotive applications, including, but not limited, use within automotive engines.

32 Claims, 5 Drawing Sheets

(51) Int. Cl.
*F16C 33/58* (2006.01)
*F16C 33/64* (2006.01)
*F16C 33/66* (2006.01)

(52) U.S. Cl.
CPC .......... *F16C 33/208* (2013.01); *F16C 33/585* (2013.01); *F16C 33/64* (2013.01); *F16C 33/6681* (2013.01); *F16C 33/203* (2013.01); *F16C 2202/50* (2013.01); *F16C 2206/04* (2013.01); *F16C 2208/02* (2013.01); *F16C 2208/58* (2013.01); *F16C 2208/86* (2013.01); *F16C 2208/90* (2013.01); *F16C 2220/70* (2013.01); *F16C 2223/02* (2013.01); *F16C 2223/42* (2013.01); *F16C 2223/60* (2013.01); *F16C 2240/40* (2013.01); *F16C 2240/48* (2013.01); *F16C 2240/54* (2013.01); *F16C 2240/60* (2013.01); *F16C 2360/22* (2013.01)

(58) Field of Classification Search
CPC .... F16C 33/206; F16C 33/208; F16C 33/585; F16C 33/64; F16C 33/6681; F16C 2223/02; F16C 2223/42; F16C 2223/60; F16C 2206/04; F16C 2220/70; F16C 2240/40; F16C 2220/48; F16C 2220/54; F16C 2220/60; F16C 2202/50; F16C 2208/02; F16C 2208/58; F16C 2208/86; F16C 2208/90; F16C 2360/22

See application file for complete search history.

(56) References Cited

U.S. PATENT DOCUMENTS

| | | | |
|---|---|---|---|
| 2008/0070815 | A1 | 3/2008 | Kamada et al. |
| 2010/0298600 | A1* | 11/2010 | Lee .................. C01B 33/10778 562/523 |
| 2011/0006218 | A1 | 1/2011 | Mochalin et al. |
| 2012/0106882 | A1* | 5/2012 | Ponnouradjou ........... B32B 7/12 384/297 |
| 2014/0037236 | A1* | 2/2014 | Kobayakawa .......... F16O 33/22 384/397 |
| 2014/0348450 | A1* | 11/2014 | Kachoosangi ......... B82Y 30/00 384/276 |

FOREIGN PATENT DOCUMENTS

| | | |
|---|---|---|
| JP | H07-505831 A | 6/1995 |
| JP | 2013-539846 A | 10/2013 |
| WO | WO-2007/133765 A2 | 11/2007 |

OTHER PUBLICATIONS

English abstract for CN-102008733.
Machine translation of the detailed description of JP-07-505831 retrieved from the Japanese Patent Office on Mar. 22, 2019.
English translation of Japanese Office Action for JP2016-575431, dated Jan. 8, 2019.

* cited by examiner

BEARING ELEMENT AND SLIDING LAYER MATERIAL FOR A BEARING ELEMENT

CROSS-REFERENCE TO RELATED APPLICATIONS

This application claims priority to International Patent Application No. PCT/EP2015/063353, filed on Jun. 15, 2015, and United Kingdom Patent Application No. GB 1411314.6, filed on Jun. 25, 2015, both of which are hereby incorporated by reference in their entirety.

TECHNICAL FIELD

This invention relates to a bearing element. The invention also relates to a sliding layer material for a bearing element.

Bearing elements and sliding layer materials according to preferred embodiments of the present invention are particularly suitable for use as, or as part of, hydrodynamic plain bearing elements.

Bearing elements and sliding layer materials according to preferred embodiments of the present invention are particularly suitable for use in automotive applications. Suitable applications may include: coatings for bearing shells for supporting rotatable engine components, including crankshafts and/or camshafts; and coatings for bearing elements for use as, or as part of, thrust washers and flange bearing assemblies. The sliding layer material may also be used to coat other sliding surfaces, for example in an engine.

BACKGROUND

It is known to disperse micro-particles (i.e. particles generally defined as being of between 0.1 and 100 microns (μm) in size) of a hard material such as nitrides, carbides (e.g. silicon carbide (SiC) and tungsten carbide (WC)), borides and oxides in a polymer matrix to form polymeric bearing coatings for use in automotive environments. This can increase the load-carrying capacity and decrease the wear rate of bearing elements. These hard micro-particles typically have an average particle size in the range 1-10 microns. For example, micro-particles such as nitrides, carbides (e.g. silicon carbide (SiC) and tungsten carbide (WC)), borides and oxides are commonly used to improve the wear resistance of bearing elements coated with a polymer-based sliding layer (or 'running layer' or 'overlayer').

However, the inventors' tests have shown that there may be limitations associated with the use of hard micro-particles in sliding layer materials, particularly for bearings coated with a polymer-based sliding layer for automotive applications. The tests have indicated that inclusion of hard micro-particles in sliding layer materials may promote fatigue, particularly of polymeric bearing coatings, which may be undesirable as it may increase wear rate and decreases bearing lifetime.

The inventors have also identified that inclusion of hard micro-particles in sliding layer materials necessitates a certain minimum thickness of the sliding layer which may be undesirable as it may increase friction by comparison with thinner polymeric bearing coatings. The inventors have further identified that inclusion of hard micro-particles in sliding layer materials may lead to localised 'hard spots' in the sliding layer, particularly if the layer thickness is insufficient, which may lead to uneven wear and so may be undesirable.

The invention aims to address one or more of these problems.

SUMMARY

The invention provides a bearing element and a sliding layer material for a bearing element, as defined in the appended independent claims to which reference should now be made.

The inventors have thus appreciated that there may be benefits associated with the use of surface-functionalised nanodiamonds, or surface-functionalised diamonds having an average particle size between about 1 and about 10 nanometers (nm), or surface-functionalised diamonds of a size range having D90 of about 5 nm to 7 nm or less, or surface-functionalised diamonds of other size ranges described herein, in a polymer matrix to form polymer-based sliding layers for bearing elements for automotive applications. The surface-functionalised nanodiamonds are a form of nano-particles (i.e. particles generally defined as having an average particle size of 1 to 100 nanometers (nm)).

The inventors' investigations indicate that surface-functionalised nanodiamonds may be well-bonded to the polymeric material or matrix, unlike the hard micro-particles that are conventionally used in known polymer-based sliding layer materials. The investigations also indicate that surface-functionalisation of the nanodiamonds may provide improved interfacial interaction of the nanodiamonds with the polymer matrix. For example, the surface functionalisation may be predetermined, or controlled, so as to control the strength of bonding between the nanodiamonds and the polymer. The use of surface functionalised nanodiamonds in bearing elements comprising polymer-based sliding layers may provide wear resistance which is at least comparable to, and may be better than, prior art bearing elements. Such nanodiamonds may also provide an improvement to fatigue performance of the sliding layer compared to that of prior art sliding layer materials (i.e. an increase in the resistance of the sliding layer material to fatigue).

Preferred or advantageous features of the present invention are set out in the dependent claims to which reference should now be made. These features include the following.

Preferably, the surface-functionalised nanodiamonds are surface-functionalised detonation nanodiamonds. The inventors' understanding is that such nanodiamonds provide advantages over nanodiamonds made by other processes. For example, detonation synthesised nanodiamonds may have a very high surface area which may be significantly greater than that of nanodiamonds made by other processes. As such, only a very small quantity of detonation nanodiamonds may be required in order to provide an improved bearing element having some or all of the aforementioned advantages over prior art bearing elements. The detonation process may also reduce or eliminate impurities which may result from alternative processes for making nanodiamonds.

Preferably, the surface-functionalised nanodiamonds comprise one or more functional groups selected from the group consisting of: oxygen-containing, nitrogen-containing and hydrogen-containing functional groups.

Preferably, the surface-functionalised nanodiamonds comprise one or more functional groups selected from the group consisting of: hydrogen (—H), hydroxyl (—OH), carboxyl (—COOH), amino (—NH$_2$) and nitro (O$_2$N).

Preferably, the surface-functionalised nanodiamonds comprise carboxyl(—COOH) functional groups. Alternatively, the surface-functionalised nanodiamonds may comprise amino (—NH$_2$) functional groups. Alternatively, the surface-functionalised nanodiamonds may comprise both —COOH and —NH$_2$ functional groups (i.e. two species of nanodiamonds) in any ratio or combination.

The sliding layer material preferably comprises an average nanodiamond particle size of between about 1 nm and about 10 nm. The sliding layer material preferably comprises nanodiamonds having a D90 of between 1 nm and 10 nm, preferably between about 5 nm and about 7 nm, preferably about 6 nm. Such nanodiamonds may have a high surface area permitting the dispersion of a lower wt % of nanodiamonds in a sliding layer material than might otherwise be required if nanodiamonds having a larger D90 were used.

Preferably, the sliding layer material comprises between 0.05 wt % and 0.5 wt % surface-functionalised nanodiamonds. The sliding layer material may, for example, comprise more than 0.05, 0.075, 0.1, 0.15 or 0.2 wt %, and/or less than 0.5, 0.45, 0.40, 0.35, 0.3, 0.25, 0.2 or 0.15 wt % surface-functionalised nanodiamonds. The sliding layer material may comprise between about 0.15 wt % and about 0.25 wt % surface-functionalised nanodiamonds or between about 0.05 wt % and about 0.15 wt % surface-functionalised nanodiamonds or between about 0.05 wt % and about 0.075 wt % surface-functionalised nanodiamonds.

Tests have indicated that a substantial reduction in the coefficient of friction at the bearing surface compared with known bearings comprising hard microparticles may be achieved with the addition of nanodiamonds at concentrations in the region of about 0.05 to about 0.1 wt % of the final sliding layer material. Tests have further indicated that the incremental benefit (in the form of a reduction in the coefficient of friction at the bearing surface) tapers off with the addition of nanodiamonds at concentrations above about 0.1 wt % of the final sliding layer material. Tests have further indicated that a reduction in the wear rate of the sliding layer material of about 20% to 30% compared with known bearings comprising hard microparticles may be achievable with the addition of nanodiamonds at concentrations in the region of about 0.1 wt % of the final sliding layer material.

In a preferred form of a bearing element according to preferred embodiments of the present invention, which may be particularly suitable for automotive applications, a bearing element comprises a bearing element substrate and a sliding layer made from a sliding layer material. The sliding layer material comprises a polymeric material. The sliding layer material also comprises surface-functionalised nanodiamonds. The nanodiamonds preferably have a D90 of between about 1 nm and about 10 nm, preferably between about 5 nm and about 7 nm.

A preferred bearing element may comprise a bearing element substrate (or interlayer), a sliding layer (or overlayer) deposited on the bearing element substrate and a backing layer underlying the bearing element substrate. The backing layer may provide strength and resistance to deformation of the bearing element substrate when it is installed in a main bearing housing or in a connecting rod big end, for example.

As discussed below, bearing elements according to preferred embodiments of the present invention may be provided as semi-circular or semi-cylindrical bearing elements or bearing shells.

Preferably, an average thickness of the sliding layer applied to the bearing element substrate may be between about 1 μm and about 20 μm. Preferably, an average thickness of the sliding layer applied to the bearing element substrate may be between about 6 μm and about 14 μm.

Preferably, the sliding layer comprises at least two layers. Alternatively, the sliding layer may comprise more than two layers. It may, for example, comprise three layers or four layers or five layers. Preferably, a thickness of each of the two or more layers may be substantially equal.

Applying the sliding layer material to the bearing element substrate in at least two or more layers may advantageously allow the thickness of each layer to be less than if the sliding layer were applied in a single layer. It may also help to prevent sagging or running of the sliding layer and/or to provide more uniform thickness of the sliding layer over the bearing element substrate. Tests have indicated that applying the sliding layer in at least two layers may provide an optimum balance between the wear and fatigue performance of the sliding layer and the cost of manufacturing the bearing element.

At least one layer of the at least two layers of the sliding layer may comprise a different percentage by weight of surface-functionalised nanodiamonds than at least one other layer of the sliding layer.

A percentage weight of surface-functionalised nanodiamonds in a middle layer of the sliding layer may be different (higher or lower) to the percentage weight of nanodiamonds in at least one of the outer layers of the sliding layer. (The outer layers of the sliding layer are the bearing surface layer and the layer adjacent to the bearing element substrate).

A percentage weight of surface-functionalised nanodiamonds in the sliding layer material may be higher in a layer adjacent to the substrate than in a layer forming a bearing surface, the percentage weight in the, or each, intermediate layer preferably being equal to, or between, the higher and lower percentage weights.

Alternatively, or in addition, a percentage weight of nanodiamonds in the sliding layer may decrease with each layer from the substrate. In other words, the layer in contact with the substrate may contain a highest weight percentage of nanodiamonds and the layer forming the bearing surface may contain a lower, or the lowest, weight percentage of nanodiamonds. This may advantageously provide a bearing in which the hardness of the sliding layer increases and the associated wear resistance progressively increases as the sliding layer wears during use of the bearing element.

A matrix of the sliding layer material is formed of a polymeric material. Examples of suitable polymeric materials include or may comprise: cross-linkable bonding agents; thermosetting plastics; high melting point thermoplastics; materials having a matrix of at least one high melting point thermoplastic material; fibre-reinforced plastics; any combination of these materials. Other suitable materials are envisaged and will be readily apparent to the skilled person. Particularly suitable polymeric materials include: PAI (polyamide imide); PI (polyimide); epoxy; epoxy resin; PBI (Polybenzimideazole); phenolic resin; silicone resin; or a combination of any of these materials. These materials are characterised by high temperature resistance and excellent media resistance (such as chemical resistance to lubricants).

One particularly preferred polymeric material for bearing elements according to preferred embodiments of the present invention is polyamide imide (PAI). As mentioned above, the surface-functionalised nanodiamonds preferably comprise —COOH and/or —NH$_2$ functional groups attached to their surfaces. Tests have indicated that a polyamide imide (PAI) resin may react effectively either with —COOH functionalised nanodiamonds, or with —NH$_2$ functionalised nanodiamonds, or a combination of the two. Tests have also indicated that —NH$_2$ functionalised nanodiamonds may provide a slight advantage over —COOH functionalised nanodiamonds. This is because relatively larger carboxyl (—COOH) groups on an un-crosslinked (i.e. un-cured) PAI polymer chains are more easily accessible than relatively smaller amino groups on the un-crosslinked (i.e. un-cured) PAI polymer chains to functionalised nanodiamonds. Therefore, due to steric hindrance, —NH$_2$ functionalised nanodiamonds may be more likely to attach themselves to relatively larger exposed carboxyl (—COOH) groups on the PAI polymer chains whereas —COOH functionalised nanodiamonds may be less likely to attach themselves to relatively smaller exposed —NH$_2$ groups on the PAI polymer chains. In other words, —NH$_2$ functionalised nanodiamonds may attach themselves more easily and thereby react more effectively than —COOH functionalised nanodiamonds with the un-crosslinked (i.e. un-cured) PAI polymer chains. As such, in embodiments in which a combination of —NH$_2$ functionalised nanodiamonds and —COOH functionalised nanodiamonds are to be added to the sliding layer material, there may be an advantage in including a higher relative proportion of —NH$_2$ functionalised nanodiamonds than —COOH functionalised nanodiamonds. Tests have further indicated that there is a balance to be achieved between (i) effective bonding between the functionalised nanodiamonds and the PAI polymer chains and (ii) linking of the polymer chains when the sliding layer material is cured in order to maintain strength of the polymer based sliding layer whilst providing the desired increase in wear resistance and resistance to fatigue due to the presence of nanodiamonds.

The sliding layer material may optionally include at least one solid lubricant. Suitable solid lubricants include: metal sulphides with layered structures; graphite; hexagonal boron nitride (h-BN); molybdenum disulfide (MoS$_2$); tungsten disulphide (WS$_2$); PTFE; or a combination of any of these materials. Other suitable materials are envisaged and will be readily apparent to the skilled person.

Preferably, the sliding layer material further comprises polytetrafluoroethylene (PTFE). The sliding layer material may comprise between about 3 wt % and about 12 wt % PTFE, preferably between about 6 wt % and about 8 wt % PTFE.

The sliding layer material may further comprise molybdenum disulphide (MoS$_2$).

The sliding layer material may optionally comprise one or more other types of hard micro-particle and/or nano-particle in powdered form or another form (e.g. flaked form). Some suitable hard particle materials include: nitrides; carbides; borides; oxides (e.g. iron oxide); metal powders; and metal flakes (e.g. aluminium flakes). Other suitable materials are envisaged and will be readily apparent to the skilled person.

The sliding layer material may optionally comprise one or more pigments or materials to induce a colour of the sliding layer. The sliding layer material may, for example, comprise aluminium flakes or carbon black. In one example embodiment, the sliding layer material may comprise between about 10 wt % and about 30 wt % aluminium flakes, preferably between about 15 wt % and about 25 wt % aluminium flakes.

Preferably, the bearing element substrate comprises an iron, aluminium or copper alloy, or a bronze or a brass material. These materials may provide good running surfaces in an emergency situation so that, for example, if the polymer were to wear away rapidly, the bearing element may not seize immediately.

It is believed that the sliding layer material of the present invention may be used to extend the range of possible uses, or applications, of some bearing element substrate materials which may otherwise have somewhat limited resistance to fatigue. The sliding layer material of the present invention may therefore enable lighter, lower cost, bearing element substrate materials (e.g. aluminium) to be used for bearing elements for certain applications (e.g. plain bearing elements for automotive environments), instead of heavier, more expensive materials (e.g. bronze) that may otherwise be required for such bearing elements.

The bearing element may further comprise a metallic back, underlying the bearing element substrate. This may provide the bearing element with greater hoop strength and rigidity. Preferably, the bearing element comprises a steel back.

Preferably, the sliding layer is applied to the bearing element substrate by a spraying operation. A preferred method, which includes a preferred spraying operation, of manufacturing bearing elements according to preferred embodiments of the present invention is discussed below.

As mentioned above, preferably, an average thickness of the sliding layer applied to the bearing element substrate may be between about 1 μm and about 20 μm, preferably between about 6 μm and about 14 μm. The desired average thickness of the sliding layer may vary according to a material selected for the bearing element substrate. For example, in an embodiment in which the bearing element substrate comprises aluminium or an aluminium alloy, an average thickness of the sliding layer applied to the bearing element substrate may be between about 6 μm and about 12 μm, preferably about 9 μm. In an alternative embodiment in which the bearing element substrate comprises bronze or a bronze alloy, an average thickness of the sliding layer applied to the bearing element substrate may be between about 8 μm and about 14 μm, preferably about 11 μm.

The sliding layer material of the present invention may advantageously provide enhanced wear resistance and/or improved resistance to fatigue when compared to known sliding layer materials. This may make the sliding layer material particularly suitable for use in environments involving high temperatures and high velocity movement or rotation of components, including plain bearing elements for automotive applications, among others.

Bearing elements according to preferred embodiments of the present invention may be particularly suitable for use in fluid-lubricated applications. Particularly advantageous applications for the bearing elements are as sliding bearings for use in combustion engines, for example crankshaft and/or camshaft supporting bearings, big end bearings and small end bushings.

Bearing elements according to preferred embodiments of the present invention may also be particularly suitable for use in vehicle engines, including those equipped with stop-start engine technology in which the engine may be subjected to a substantially greater number of starts over the life of the engine than in conventional engines and in which the crankshaft may regularly, or frequently, be accelerated from rest before a uniform hydrodynamic film of lubricant is established on the bearing/running surface.

Bearing elements according to preferred embodiments of the present invention may also be used to form any one of a number of sliding surfaces on engine components including bushes, piston skirts, piston rings, liners, camshafts and conrods. They may also be used as, or as part, of any of thrust washers, flanges and half liners. Other suitable applications are envisaged and will be readily apparent to the skilled person.

BRIEF DESCRIPTION OF THE DRAWINGS

Preferred embodiments of the present invention will now be described by way of example only and with reference to the accompanying drawings, in which.

DETAILED DESCRIPTION

In order to introduce surface-functionalised nanodiamonds, or surface-functionalised diamonds having an average particle size between about 1 and about 10 nanometers (nm), or surface-functionalised diamonds of a size range having D90 of about 5 nm to 7 nm or less, into a bearing element, these nanodiamonds, or diamonds of the desired size range, must first be made. There are several known methods for making nanodiamonds, or diamonds of the desired size range. An exemplary method of making nanodiamonds, or diamonds of the desired size range, for use in bearing elements according to preferred embodiments of the present invention is by detonation. Nanodiamonds made by this process are referred to as "detonation nanodiamonds".

Figure 1:
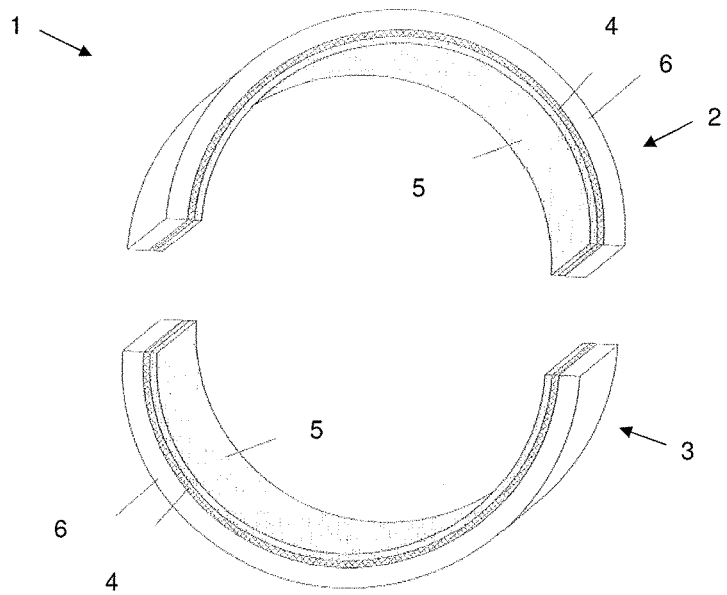
FIG. 1 shows a pair of semi-cylindrical bearing elements according to preferred embodiments of the present invention.

A suitable process for making detonation nanodiamonds is described in a Nature Nanotechnology Review Article entitled, "*The properties and applications of nanodiamonds*" by Vadym N. Mochalin, Olga Shenderova, Dean Ho and Yury Gogotsi published online on 18 Dec. 2011 and in the January 2012 vol 7 edition of "Nature Nanotechnology" (DOI: 10.1038/NNANO.2011.209) ("the Review Article"). Particular reference should be made to FIGS. 1 and 2 and the associated descriptions and in the section headed "Synthesis and purification".

Nanodiamonds for use in bearing elements in preferred embodiments of the present invention may have an average particle size of between about 1 nm and about 10 nm. The nanodiamonds preferably have a D90 of between about 5 nm and about 7 nm, preferably about 6 nm. Suitable (conventional) processes for measuring particle size include Transmission Electron Microscopy (TEM), Raman spectroscopy, X-ray Absorption Near Edge Structure (XANES), and Fourier Transform Infrared Spectroscopy (FTIR). Any such technique may be used in relation to the present invention. Examples of suitable processes for measuring nanoparticle sizes are described in an article entitled "*Accurate Size and Size-Distribution Determination of Polystyrene Latex Nanoparticles in Aqueous Medium Using Dynamic Light Scattering and Asymmetrical Flow Field Flow Fractionation with Multi-Angle Light Scattering*" by Haruhisa Kato, Ayako Nakamura, Kayori Takahashi and Shinichi Kinugasa, published in the Nanomaterials journal (Nanomaterials 2012, 2, 15-30; doi:10.3390/nano2010015; ISSN 2079-4991).

Nanodiamonds for use in bearing elements in preferred embodiments of the present invention have functional groups attached to their surface, thereby forming "functionalised" or "surface-functionalised" nanodiamonds. This can be used to modify the surface of the nanodiamonds and provide desired properties without affecting or compromising the useful properties of the diamond core. The functional groups may be attached to the surface of the nanodiamonds during their synthesis by detonation. An exemplary process for making surface-functionalised nanodiamonds is described in the Nature Nanotechnology Review Article.

In a preferred embodiment, carboxyl (—COOH) functional groups are attached to the surface of the detonation nanodiamonds. In another preferred embodiment, amino (—$NH_2$) functional groups are attached to the surface of the detonation nanodiamonds. In a further preferred embodiment, both carboxyl (—COOH) functional groups and amino (—$NH_2$) functional groups are attached to the surface of the detonation nanodiamonds.

The surface-functionalised detonation nanodiamonds may be stored and transported in a liquid dispersion. For example, the surface-functionalised detonation nanodiamonds may be dispersed in a solvent such as N-Ethylpyrrolidone (NEP), N-Methylpyrrolidone (NMP) or Diethylene glycol (DEG), or in an aqueous solution. Tests have indicated that the nanodiamonds may dispersed in a solvent solution at concentrations of up to about 1 wt % or may be dispersed in an aqueous solution at concentrations of up to about 5 wt % of the solution.

The nanodiamonds may be prone to falling out of solution or agglomerating and so it may be necessary to de-aggregate them using a suitable process, such as dry-milling (e.g. with soluble materials such as salts and sugars), ultrasonic treatment or centrifugation.

The detonation nanodiamonds dispersed in a solvent or an aqueous solution may be further diluted. The dilute nanodiamond dispersion is then stirred into a polymeric material to form a sliding layer material to be applied to bearing elements according to preferred embodiments of the present invention. Stirring in the dilute nanodiamond dispersion slowly may help to avoid agglomeration of the nanodiamonds.

The polymeric material is preferably a polyamide imide (PAI). The PAI forms the bulk of the sliding layer material (or 'running layer' or 'overlayer'). As discussed below, the sliding layer material may comprise one or more other components, or elements.

Due to the high surface area of the detonation nanodiamonds, only a very small quantity of nanodiamonds may be required to provide the sliding layer material with the required wear and fatigue characteristics. The nanodiamonds may be added to the PAI matrix at concentrations in the range of 0.05-0.5 wt % of the final sliding layer material. In one preferred embodiment, the nanodiamonds may be added to the PAI matrix at a concentration of about 0.1 wt % of the final sliding layer material. In another preferred embodiment, the nanodiamonds may be added to the PAI matrix at a concentration of about 0.2 wt % of the final sliding layer material. In another embodiment, the nanodiamonds may be added to the PAI matrix at a concentration of about 0.05 wt % of the final sliding layer material.

A preferred bearing element is shown in FIGS. 1 to 4. The bearing element generally comprises a bearing element substrate (or interlayer), a sliding layer (or overlayer) deposited on the bearing element substrate and a backing layer underlying the bearing element substrate.

Figure 2:
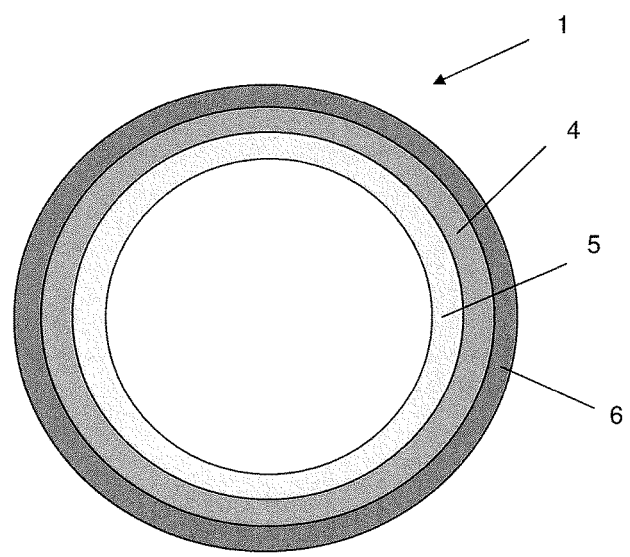
FIG. 2 shows a cylindrical bearing element formed by the pair of semi-cylindrical bearing elements of FIG. 2.

The bearing element 1, which may be used to support a rotatable shaft in an engine, may be formed as a pair of semi-circular or semi-cylindrical bearing elements 2, 3 (bearing shells) which may be brought together to form a substantially continuous, circular or cylindrical, bearing element (FIG. 2). Many alternative shapes and configurations of the bearing element are envisaged and will be readily apparent to the skilled person.

The bearing element comprises a bearing element substrate 4 and a sliding layer 5 which is applied to and supported by the substrate. The bearing element is provided with backing layer 6 underlying the substrate to provide increased stiffness and hoop strength.

An average thickness of the sliding layer applied to the bearing element substrate is preferably between about 6 μm and about 14 μm. As described above, the average thickness of the sliding layer may vary according to the material selected for the bearing element substrate to which the sliding layer is applied.

The bearing element substrate is preferably made from a metallic material to give the bearing element greater structural rigidity. Suitable substrate materials include aluminium, bronze, brass, bismuth, copper, nickel, tin, zinc, silver, gold and iron, or alloys of such materials. The substrate may also comprise an alloy of two or more of these materials. Particularly suitable substrate materials for bearing elements according to preferred embodiments of the present invention include iron, aluminium, copper, bronze brass and iron, aluminium, copper, bronze and brass alloys.

Optionally, the substrate may comprise an intermediate layer which may provide an improved surface for adhesion of the sliding layer when certain supporting bearing element materials are used. Suitable materials for the optional intermediate layer include nickel, silver, copper and/or iron or alloys comprising one or more of such materials. The optional intermediate layer may comprise a combination of two or more or such materials/alloys. The intermediate layer may also include an adhesion promoter and/or be subjected to a pre-treatment, for example a phosphating, chromating or silicating treatment.

The backing layer is preferably made from steel. Other suitable materials will be apparent to the skilled person.

The sliding layer material preferably also comprises at least one solid lubricant. In a preferred embodiment, the sliding layer material comprises polytetrafluoroethylene (PTFE). In another preferred embodiment, the sliding layer material comprises molybdenum disulfide ($MoS_2$). In another preferred example embodiment, the sliding layer material comprises both PTFE and $MoS_2$.

Figure 3:
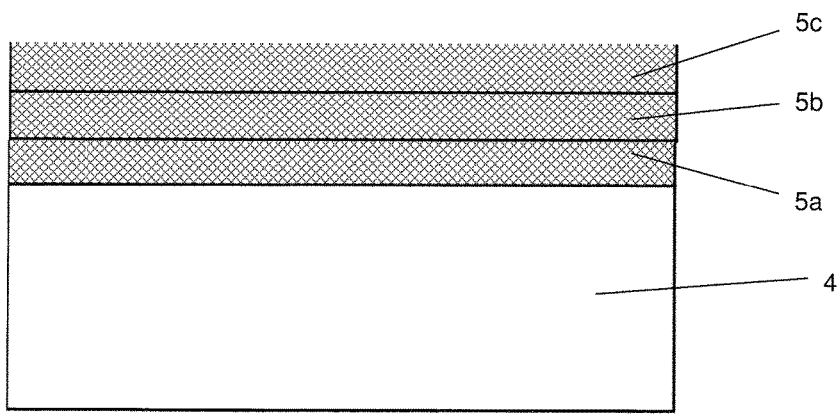
FIG. 3 shows a cross-section through a bearing element according to preferred embodiments of the present invention, in which the at least two layers of the sliding layer are of substantially equal thickness.
Figure 4:
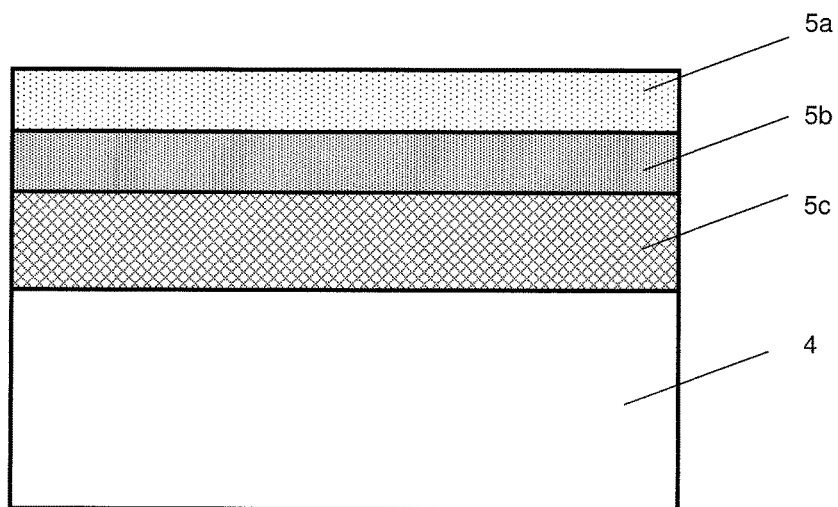
FIG. 4 shows a cross-section through a bearing element according to preferred embodiments of the present invention, in which the at least two layers of the sliding layer are of different thicknesses and the percentage weight of nanodiamonds in each layer of the sliding layer decreases from the substrate towards the outer (running) surface.

As shown in FIGS. 3 and 4, the sliding layer is applied to the substrate in at least two layers 5a, 5b. A third layer 5c may also be applied. This enables the desired overall thickness of the sliding layer to be built up in at least two layers that are thinner than for bearing elements in which the sliding layer is applied to the substrate in a single layer. Applying the sliding layer to the substrate in at least two layers has been found to provide improved thickness control, more uniform thickness of the sliding layer over the underlying bearing substrate and reduced sagging of the sliding layer material.

The sliding layer 5 is preferably applied to the substrate in at least two layers. Applying the sliding layer to the substrate in more than two layers may be beneficial. Applying the sliding layer to the substrate in, for example, three or four, or five, layers may provide improved thickness control and more uniform thickness compared to that which may be achieved when the sliding layer is applied to the substrate in two layers. A preferred number of layers of the sliding layer for bearing elements according to preferred embodiments of the present invention is four layers.

In a further preferred embodiment, the sliding layer comprises at least two layers and each layer of the at least two layers may be provided with a different composition to the composition of at least one other layer (see FIG. 4). For example, the percentage by weight of nanodiamonds in the sliding layer may vary from layer to layer. The percentage by weight of nanodiamonds in the sliding layer material may be higher, or lower, in a central layer between a first outer layer adjacent the substrate and a second outer layer forming the outer (bearing) surface. In this arrangement, the percentage by weight of nanodiamonds in the first outer layer may be the substantially the same as, or different from, the percentage by weight of nanodiamonds in the central layer and/or second outer layer.

In a further preferred embodiment, the sliding layer comprises at least two layers and a percentage by weight of nanodiamonds decreases with each layer from the substrate so that there is a higher weight percentage of nanodiamonds in the layer adjacent the substrate and a lower weight percentage in the layer forming the outer (bearing) surface. A bearing element having this construction may offer progressively higher wear resistance as each layer is worn, extending the life of the bearing beyond the life of a bearing in which the percentage by weight of nanodiamonds is the same in all of the layers of the sliding layer.

Preferably, the layers of the sliding layer material are deposited so that an overall thickness of the sliding layer is preferably between about 1 μm and about 20 μm. A preferred thickness of the sliding layer is between about 6 μm and about 14 μm.

Figure 5:
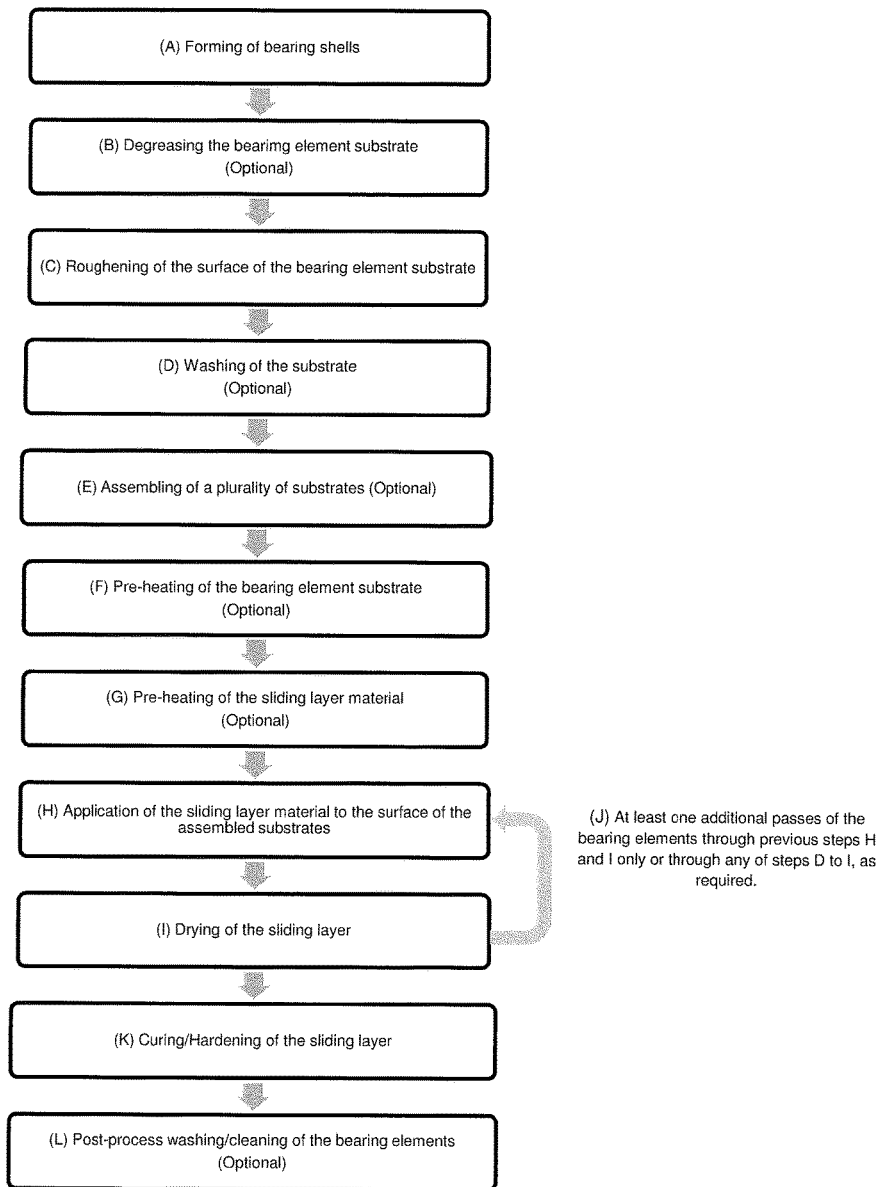
FIG. 5 is a flow diagram showing an overview of a preferred process for manufacturing bearing elements according to preferred embodiments of the present invention.

Preferred embodiments of a process for manufacturing bearing elements according to preferred embodiments of the present invention will now be described with reference to FIG. 5. Preferred embodiments of the process comprise some, or all, of the following steps:

A. forming bearing shells
B. degreasing the substrate;
C. roughening the surface of the substrate;
D. washing the substrate;
E. assembling, or arranging, a plurality of substrates for application of the sliding layer;
F. pre-heating of the assembled substrates;
G. pre-heating of the sliding layer material
H. application of the sliding layer material to the surface of the assembled substrates to form the sliding layer;
I. drying of the sliding layer;
J. additional passes of the bearing elements—for example through previous steps G to H only or through any of steps C to H, as required;
K. curing (or hardening) of the sliding layer;
L. post-process cleaning of the bearing elements.

It will be appreciated from the following description that some of the method steps listed above are optional steps and need not therefore be included in the preferred manufacturing process. It will also be appreciated that any one or more of the steps may be repeated one or more times. The preferred process steps need not be performed in the order in which they are listed above or described below.

As discussed below, bearing elements according to preferred embodiments of the present invention may be subjected to two or more passes through at least some of the method steps. This has been shown to provide enhanced thickness control of the sliding layer on the substrate and reduced sagging of the sliding layer material.

(A) Forming of Bearing Shells

Bearing shells according to preferred embodiments of the present invention may be formed by cutting blanks from a bi-metal coil of a sheet material comprising a backing material and a bearing element substrate material. The blanks are then formed into semi-circular blanks by a press tool. The semi-circular blanks are then machined along all edges to give even machined surfaces with or without chamfers. The parts are then bored to a desired wall thickness using a standard boring method.

(B) Degreasing the Substrate

Optionally, degreasing the substrate, for example to remove excess lubricant following initial forming/machining of the substrate, may be carried out. This may be done using, for example, a solvent-based or aqueous cleaning fluid.

Degreasing of the substrate preferably results in a surface tension of about ≥38 mN/m for aluminium alloy substrates or about ≥40 mN/m for bronze substrates.

(C) Roughening the Surface of the Substrate

Prior to application of the sliding layer to the substrate, the surface of the substrate may be roughened to improve adhesion of the sliding layer.

The desired surface roughness may be achieved by way of any of a number of suitable roughening processes, including mechanical procedures such as abrading, linishing, micromachining, machining of micro grooves/channels, sand-blasting, grit-blasting or grinding, and chemical procedures such as phosphating or mild chemical etching of the surface. Other suitable procedures are envisaged and will be readily apparent to the skilled person Grit blasting and/or shot-peening the surface of the substrate are believed to be the most suitable methods of preparing a substrate having a surface exhibiting the required surface roughness for bearing elements according to preferred embodiments of the present invention.

Particularly suitable materials for use in grit-blasting the surface of the substrate to achieve the desired surface roughness are alumina ($Al_2O_3$) and/or polymeric grit.

Particularly suitable materials for use in shot-peening the surface of the substrate to achieve the desired surface roughness are steel shot, ceramic beads and/or glass beads.

(D) Washing the Substrate

Optionally, after roughening of the surface of the bearing element substrate, washing may be performed to remove residues from the surface of the bearing element substrate.

Residues on the surface of the bearing element substrate following washing will preferably be ≤0.01 mg/part (per individual bearing element substrate) or <1-2 mg/m$^2$.

Grit-blasting the surface of the substrate with polymeric grit and/or shot-peening it with beads may be advantageous in that the need for washing of the surface may be reduced or eliminated.

(E) Assembling a Plurality of Bearing Element Substrates for Application of the Sliding Layer The sliding layer may be applied to the surface of each bearing element substrate individually. Preferably, the sliding layer is applied to a plurality of bearing element substrates simultaneously, or in series, to improve the manufacturing cycle efficiency and increase cycle output.

In a particularly preferred form of the method, a first plurality of bearing element substrates is laid substantially adjacent one another in a first jig with the inner diameter of each adjacent semi-cylindrical bearing element substrate facing upwardly and a second plurality of bearing element substrates is laid substantially adjacent one another in a second jig with the inner diameter of each adjacent semi-cylindrical bearing element substrate facing upwardly. The first and second jigs are then brought together so that the bearing element substrates in the first and second jigs are paired, each pair facing each other to form a substantially complete cylinder, and assembled to form a continuous column of bearing elements in a hollow, substantially cylindrical, arrangement.

(F) Pre-Heating of the Substrates

Optionally, the assembled stack of bearing element substrates may be preheated before application of the sliding layer. This may help to prevent sagging of the sliding layer material relative to the substrate.

Pre-heating of the column of bearing element substrates may be carried out convectively, for example by channeling warming air through the centre of the cylindrical column of bearing elements or, alternatively, by inserting an infrared heat into the centre of the cylindrical column of bearing elements. Other suitable methods and devices for pre-heating the substrates are envisaged and will be readily apparent to the skilled person.

The bearing elements are preferably pre-heated to a surface temperature of between about 30 and about 100 degrees C., preferably between about 40 and about 85 degrees C.

Preheating of the bearing element substrates may be carried out only prior to the application of the first layer of the sliding layer as discussed in step H below, or prior to the application of more than one, or each one, of layers of the sliding layer as discussed in step H below.

(G) Pre-Heating of the Sliding Layer Material

Optionally, before the sliding layer is applied to the bearing element substrates, the sliding layer material may be pre-heated by a heating means. The sliding layer material may be pre-heated to between about 20 degrees C. and about 80 degrees C. This may be done only prior to application of the first layer of the sliding layer discussed in step H below, or prior to the application of more than one, or each one, of layers of the sliding layer as discussed in step H below.

Matching the temperature of the sliding layer material to the temperature of the bearing element substrates before application of the sliding layer and/or maintaining the sliding layer material at a constant temperature during application of the sliding layer to the bearing element substrates may help to ensure uniformity of the sliding layer on the bearing element substrates. It may also help to maintain a constant viscosity of the sliding layer material and thereby ensure that the characteristics of the process of applying each layer of the sliding layer and that the resultant thickness of the applied layers of the sliding layer is consistent and repeatable.

A number of suitable methods and devices for pre-heating the sliding layer material are envisaged and will be readily apparent to the skilled person.

(H) Application of the Sliding Layer onto the Assembled Substrates

Figure 6:
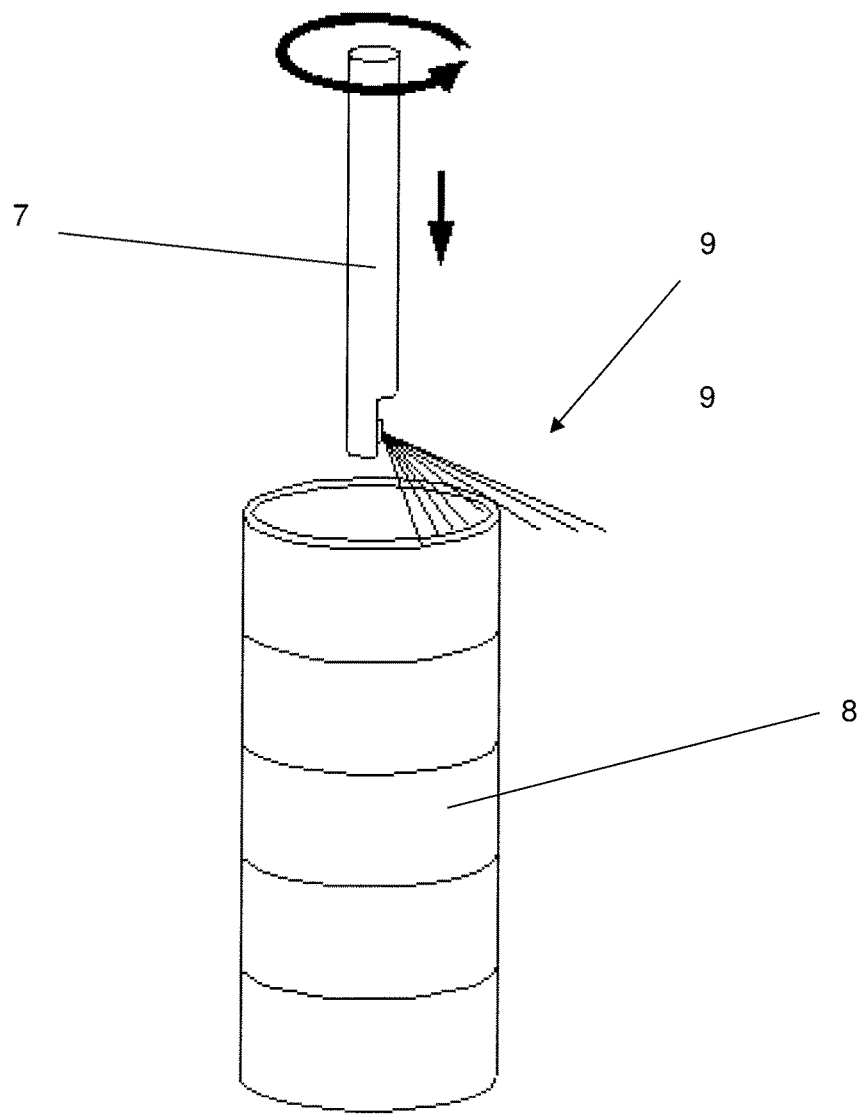
FIG. 6 shows the general arrangement of a spray lance for applying the sliding layer to the substrate of a stack of bearing elements simultaneously.

The sliding layer may be applied to the assembled substrates in one of a number of ways that will be readily apparent to the skilled person. A preferred method of applying the sliding layer onto the assembled substrates to form bearing elements according to preferred embodiments of the present invention is to spray the sliding layer material in liquid form onto the assembled substrates. The sliding layer material is preferably applied by a spray lance or nozzle (FIG. 6).

The spray lance 7 may be moved relative to the surface of the bearing element substrates 8. Alternatively, the surface of the bearing element substrates may be moved relative to the spray lance. In a further alternative, the surface of the bearing element substrates may be moved relative to the spray lance and the spray lance may be moved relative to the surface of the bearing element substrates. In this latter arrangement, the spray lance and the bearing element substrates may be moved in turn while the other is held stationary, or the spray lance and the bearing element substrates may be moved relative to one other simultaneously.

In a preferred form of the manufacturing process, the first and second pluralities of bearing element substrates are held stationary in their respective jigs in a substantially continuous column. The first and second jigs are then positioned so that the substantially cylindrical arrangement of bearing element substrates is orientated vertically as shown in FIG. 6.

The spray 9 from the lance is preferably angled at between about 30 and about 70 degrees to the normal to the column of bearing element substrates. Preferably, the spray cone is divided by the normal to the surface of the bearing element substrates so that, for example, a spray angle of about 50 degrees would form spray cone of about 25 degrees on either side of the normal to the surface of the bearing element substrates.

The spray lance may be rotated relative to the bearing element substrates. Alternatively, the bearing element substrates may be rotated relative to the spray lance. In a further alternative, the bearing element substrates may be rotated relative to the spray lance and the spray lance may also be rotated relative to the bearing element substrates. In this latter arrangement, the spray lance and the bearing element substrates may be rotated in turn while the other is held stationary, or the spray lance and the bearing element substrates may be rotated relative to each other simultaneously.

In a preferred form of the manufacturing process, the spray lance relative to the cylindrical arrangement of bearing element substrates. Rotating the spray lance relative to the substrates may be easier to control than rotating the stack of bearing substrates around a fixed lance as the rotating lance may have lower inertia and or momentum than a rotating stack.

The lance is rotated at between about 500 and about 1500 rpm, preferably at about 1000 rpm.

The rotating spray lance is advanced downwardly into the core of the column of bearing substrates and moved downwardly relative to the stationary bearing element substrates. The spray lance may be advanced continuously relative the cylindrical arrangement of bearing element substrates. Alternatively, the spray lance may be advanced relative the cylindrical arrangement of bearing element substrates between a number of pre-defined spraying locations.

The rotating lance is advanced into the upper end of the column of bearing substrates and then downwardly along the central axis of the column of bearing substrates until it passes beyond the lower end of the column of bearing substrates. It is then withdrawn upwardly along the central axis of the column of bearing substrates until it passes out of the upper end of the column of bearing substrates.

Various operating parameters of the spray lance and the spraying apparatus to which the lance is coupled may be controlled in order to control the spraying operation. For example, any or all of the following parameters may be varied in order to control the characteristics of the sliding layer, including the thickness of the sliding layer applied to the bearing element substrates: the linear velocity of the spray lance; the rotational velocity of the spray lance; the atomising pressure; the fan pressure and the size of the lance aperture.

At least some of the spray parameters may be controllable non-linearly. For example, the lance may be advanced linearly along the bearing substrates at variable velocity. The velocity may vary according to, or in combination with controlled variation of, the spray pressure and/or back pressure in the spraying apparatus. For example, the linear velocity in the centre of the vertical height of the stack may be reduced to create increased back pressure. The linear velocity may also be reduced as the lance approaches the upper and/or lower ends of the stack of bearing substrates.

The spray pressure may be varied during the movement of the spray lance downwardly through the column of bearing element substrates. Further, the rotational velocity of the lance may be kept constant throughout each spraying operation or may be variable.

Figure 7:
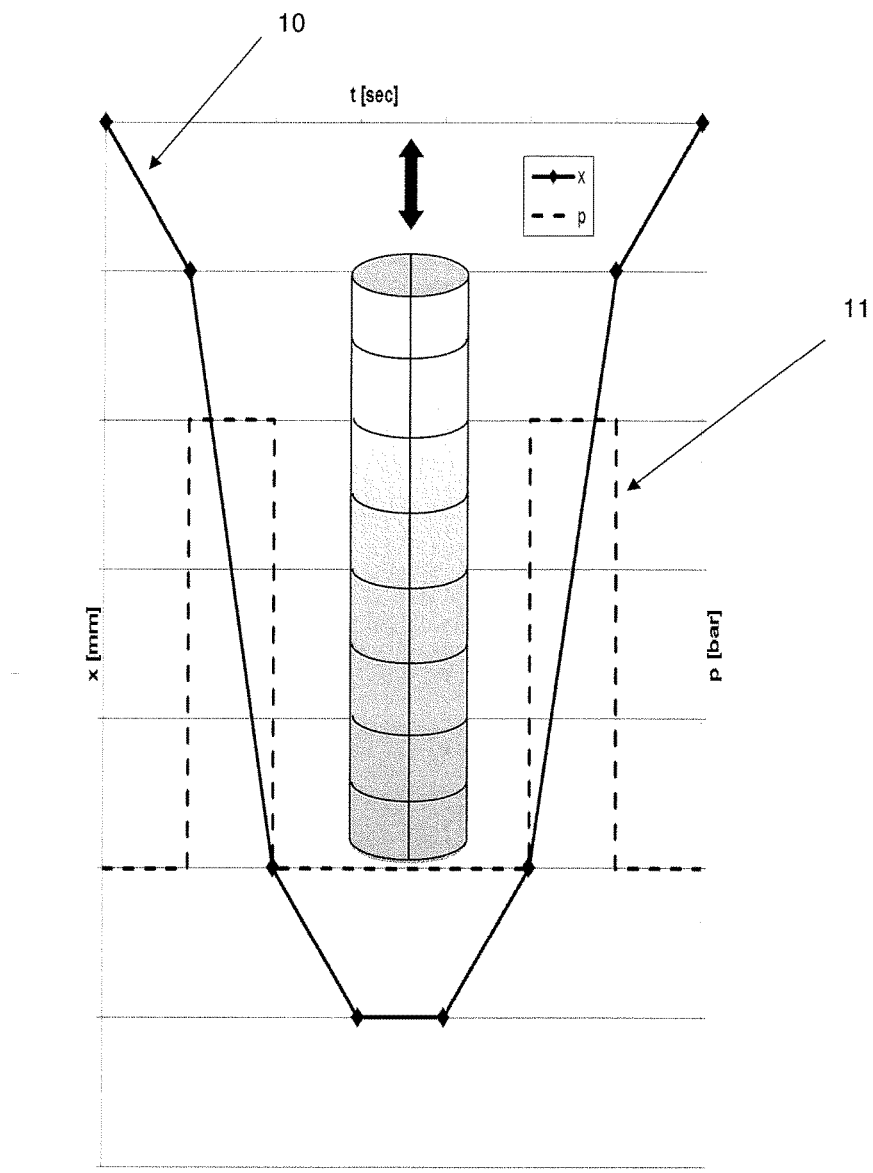
FIG. 7 is a diagram illustrating an example of a variable spray lance velocity profile and a variable spray pressure profile.

The linear velocity of the spray lance and/or the spray pressure may be variable over the duration of each spraying operation. An example profile of the linear velocity of the spray lance and the spray pressure is shown in FIG. 7 in which: the horizontal axis represents time; the left hand vertical axis represents distance in mm; and the right hand vertical axis represents spray pressure in bar. The solid line 10 shows the linear velocity of the spray lance (variation of linear movement of the spray lance with time). The dotted line 11 shows the variation of the spray pressure with time. The figure includes an example of a stack of bearing elements.

It will be appreciated from the solid line profile (linear velocity of the spray lance) shown in the example of FIG. 7 that the linear velocity of the spray lance is increased as it enters the upper end of the column of bearing elements and maintained as it is moved downwardly along the length column of bearing elements. The linear velocity is then decreased as the spray lance is advanced beyond the lower end of the column of bearing elements. The spray lance is held stationary for a period of time below the lower end of the column of bearing elements. The linear velocity of the spray lance is increased as the lance re-enters the lower end of the column of bearing elements and maintained as it is moved upwardly along the length column of bearing elements. The linear velocity of the spray lance is then reduced again as the spray lance is withdrawn from the upper end of the column of bearing elements.

It will also be appreciated from the dotted line profile (spray pressure) shown in the example of FIG. 7 that: the spray pressure is at a minimum (or switched off) when the spray lance enters the upper end of the column of bearing elements; the spray pressure is at a maximum as the spray lance is moved downwardly along the length column of bearing elements; the spray pressure is at a minimum (or switched off) as the spray lance is advanced beyond the lower end of the column of bearing elements; the spray pressure remains at a minimum (or switched off) as the spray lance re-enters the lower end of the column of bearing elements; the spray pressure is at a maximum as the spray lance is moved upwardly along the length column of bearing elements; and the spray pressure is reduced to a minimum (or switched off) as the spray lance is withdrawn from the upper end of the column of bearing elements.

In the example profile of FIG. 7, the linear velocity profile and the spray pressure profile are symmetrical and spraying of the sliding layer material onto the bearing elements occurs both as the spray lance is advanced downwardly relative to the column or bearing elements and as the spray lance is advanced upwardly relative to the column or bearing elements. It will be appreciated that the either, or both, of the velocity profile and the spray pressure profiles may not be symmetrical. It will further be appreciated that spraying of the sliding layer material may occur only during downward or upward movement of the spray lance relative to the column of bearing elements.

The spray lance may be rotated during both, or only, one of the upward and downward motions relative to the column of bearing elements. The spray lance may be rotated in the same or in opposite directions during the upward and downward motions of the spray lance relative to the column of bearing elements.

(I) Drying of the Sliding Layer

After spraying of the sliding layer material described in step H, a drying (or flash-off) step is performed in which the sliding layer material is dried. The drying step preferably leaves a continuous, thin-film, of the sliding layer material on the substrate and results in substantially dry-to-touch bearing elements.

Drying of the sliding layer may be achieved by one of a number of suitable methods. The bearing elements may be dried while the bearing elements remain in the cylindrical configuration. Alternatively, the first and second jigs may be separated and the first and second pluralities of the bearing elements dried separately.

In one suitable drying method, warm air is channeled through the centre of the cylindrical column of bearing elements and passes over the surfaces of the bearing elements so as to dry the sliding layer convectively. In another suitable drying method, a heat source, such as an infrared heat source, is passed along the centre of the cylindrical column of bearing elements. In a further suitable drying method, drying of the sliding layer is achieved by heating the bearing elements from the back, through the jig, for example using a suitable heating element, such as an induction heater. Other suitable methods and devices for drying the sliding layer are envisaged and will be readily apparent to the skilled person.

In an embodiment of the bearing element in which a solvent is included in the sliding layer material fluid, the majority of the solvent is driven off during the drying step so as to leave a continuous thin film of the sliding layer material on the substrate.

(J) Additional Passes of the Bearing Elements

In a manufacturing process according to preferred embodiments of the present invention, the bearing elements are subjected to at least two passes through the spraying step (Step F) and the drying step (Step G), the at least two passes comprising the following steps:

(J1a) a first spraying step (as discussed in Step H);
(J1b) a first drying step (as discussed in Step I);
(J2a) a second spraying step (as discussed in Step H);
(J2b) a second drying step (as discussed in Step I);

Steps I1a and I1b form the first pass (as discussed in Steps H and I). Steps I2a and I2b form the second pass. Additional spraying and drying steps may form additional passes, if required.

After the first pass, the bearing elements are brought back together (if the column was disassembled for drying and/or washing) to form a column which is positioned vertically. A second pass consisting of spraying step (I2a) and drying step (I2b) is then performed in the manner described in Steps H and I above.

Any number of additional passes may be performed as required to achieve and control a desired thickness of the sliding layer.

Preferably, between each of the at least two passes, the column of bearing elements is indexed (i.e. moved or rotated through a predetermined distance or angle) so that the second (I2a) (and any additional spraying steps) begin at a different location on the internal diameter of the bearing elements from location on the internal diameter of the bearing elements at which the first spraying operation (Step H) was begun.

Preferably, the stack of bearing elements is indexed after each of pass by an amount that is equal to 360 degrees divided by the number of passes to be performed. For example, in a process in which two passes are to be performed, the stack of bearing elements may be indexed by about 180 degrees after each pass before the next pass begins. In a process in which three passes are to be performed, the stack of bearing elements will be indexed by about 120 degrees after each pass before the next pass begins. In a process in which four passes are performed, the stack of bearing elements will be indexed by about 90 degrees after each pass before the next pass begins.

Indexing may be achieved by any suitable means, for example by a stepper motor. Other suitable means are envisaged and will be readily apparent to the skilled person.

Indexing the bearing elements may help to provide improved control over the thickness of the sliding layer and greater uniformity of the thickness of the at least two layers of the sliding layer.

The bearing elements may be washed following one, or following each pass.

It may be beneficial to vary the parameters of the spraying and/or drying step between any two of the passes or between each of the at least two passes. It may, for example, be beneficial to vary any, some or all of the following: the rotational velocity of the spray lance; the direction of rotation of the spray lance; the linear velocity of the spray lance; the size of the spray lance aperture; the spray pressure of the sliding layer material; the spray angle of the spray cone relative to the normal to the surface of the bearing elements; the duration of the spraying step; the duration of the drying step; and the temperature of the heating/drying means used to dry the sliding layer.

(K) Curing (or Hardening) of the Sliding Layer

After spraying of the sliding layer material and drying of the sliding layer, the sliding layer is cured. Curing hardens the polymeric material and causes cross-linking of the polymer chains. Curing gives the sliding layer the desired sliding or running properties.

Curing of the sliding layer may be achieved by one of a number of suitable methods. The bearing elements may be cured while the bearing elements remain in the cylindrical configuration. Alternatively, the first and second jigs may be separated and the first and second pluralities of the bearing elements cured separately by the same or by separate curing devices.

In one suitable curing method, warm air is channeled through the centre of the cylindrical column of bearing elements and passes over the surfaces of the bearing elements so as to cure the sliding layer convectively. In another suitable curing method, a heat source, such as an infrared heat source, is passed along the centre of the cylindrical column of bearing elements. In a further suitable curing method, curing of the sliding layer is achieved by heating the bearing elements from the back, through the jig, for example using a suitable heating element, such as an induction heater. Other suitable methods and devices for curing the sliding layer are envisaged and will be readily apparent to the skilled person.

Curing may be carried out in a furnace, for example a batch furnace or a tunnel furnace, or another suitable heating device. The bearing elements are preferably cured at a temperature of greater than 150 degrees C. Where the bearing elements are cured in a furnace, it is preferable that the column of bearing elements is separated and the two jigs positioned so that each of first and second pluralities of bearing elements is orientated horizontally with their inner (bearing) surfaces facing upwardly. Alternatively, the bearing elements may be separated and put on trays or a conveyer belt, in the case of a tunnel furnace.

It has been found that only a single curing step following the final pass (i.e. after the third, or final, drying step) is required. However, it may also be beneficial to include a curing step after one or more of the earlier passes and may be beneficial to include a curing step after each pass before the next pass begins.

(L) Post-Process Washing of the Bearing Elements.

Optionally, the bearing elements may be washed after one or more of the steps of the manufacturing process. The bearing elements are preferably washed with an aqueous solution. Washing of the bearing elements is preferably carried out following the step of curing the sliding layer. Additional washing steps may be performed, as required, after other steps in the manufacturing process.

The invention claimed is:

1. A bearing element comprising:
a bearing element substrate; and
a sliding layer of a sliding layer material, the sliding layer material including a polymeric material and nanodiamonds;
wherein the nanodiamonds are surface-functionalised nanodiamonds, and
wherein the sliding layer includes at least two layers with the surface-functionalised nanodiamonds, with one of the at least two layers having a first/percentage by weight of the surface-functionalised nanodiamonds, and another of the at least two layers having a second percentage by weight of the surface-functionalised nanodiamonds that is different from the first percentage.

2. The bearing element according to claim 1, wherein the surface-functionalised nanodiamonds have an average particle size of between 1 nm and 10 nm.

3. The bearing element according to claim 1, wherein the surface-functionalised nanodiamonds have an average particle size of between 5 nm and 7 nm.

4. The bearing element according to claim 1, wherein the surface-functionalised nanodiamonds are surface-functionalised detonation nanodiamonds.

5. The bearing element according to claim 1, wherein the surface-functionalised nanodiamonds have at least one functional groups including at least one of an oxygen-containing functional group, a nitrogen-containing functional group, and a hydrogen-containing functional group.

6. The bearing element according to claim 1, wherein the surface-functionalised nanodiamonds have at least one functional group including at least one of hydrogen, hydroxyl, carboxyl, amino, and nitro.

7. The bearing element according to claim 1, wherein the surface-functionalised nanodiamonds include carboxylic acid functional groups.

8. The bearing element according to claim 1, wherein the surface-functionalised nanodiamonds include amino functional groups.

9. The bearing element according to claim 1, wherein the sliding layer material includes between 0.05 wt % and 0.5 wt % surface-functionalised nanodiamonds.

10. The bearing element according to claim 1, wherein the sliding layer material includes between 0.15 wt % and 0.25 wt % surface-functionalised nanodiamonds.

11. The bearing element according to claim 1, wherein the sliding layer material includes between 0.05 wt % and 0.15 wt % surface-functionalised nanodiamonds.

12. The bearing element according to claim 1, wherein the sliding layer material includes between 0.05 wt % and 0.075 wt % surface-functionalised nanodiamonds.

13. The bearing element according to claim 1, wherein a thickness of the sliding layer is between 1 µm and 20 µm.

14. The bearing element according to claim 13, wherein the thickness of the sliding layer is between 6 µm and 14 µm.

15. The bearing element according to claim 1, wherein the sliding layer-includes at least three layers.

16. The bearing element according to claim 1, wherein the sliding layer-includes at least four layers.

17. The bearing element according to claim 1, wherein a thickness of each the at least two layers is substantially equal.

18. The bearing element according to claim 1, wherein the at least two layers includes the one layer as a middle layer and the another layer as an outer layer, and wherein the percentage weight of surface-functionalised nanodiamonds in the middle layer is higher than a percentage weight of nanodiamonds in the outer layer.

19. The bearing element according to claim 1, wherein the percentage weight of surface-functionalised nanodiamonds decreases with each layer of the sliding layer from the bearing element substrate.

20. The bearing element according to claim 1, wherein the bearing element substrate includes one of an aluminium, iron, copper, tin, and bronze alloy.

21. The bearing element according to claim 1, wherein the polymeric material includes polyimide imide.

22. The bearing element according to claim 1, wherein the sliding layer material further includes polytetrafluoroethylene.

23. The bearing element according to claim 1, wherein the sliding layer material further includes molybdenum disulphide.

24. A sliding layer material for a bearing element, comprising:
a polymeric material; and
nanodiamonds;
wherein the nanodiamonds are surface-functionalised nanodiamonds; and
wherein the sliding layer includes at least two layers with the surface-functionalised nanodiamonds, with one of the at least two layers having a first percentage by weight of the surface-functionalised nanodiamonds, and another of the at least two layers having a second percentage by weight of the surface-functionalised nanodiamonds that is different from the first percentage.

25. The sliding layer material according to claim 24, wherein the nanodiamonds have an average particle size of between 1 nm and 10 nm.

26. The sliding layer material according to claim 25, wherein the surface-functionalised nanodiamonds have an average particle size of between 5 nm and 7 nm.

27. The sliding layer material according to claim 25, wherein the nanodiamonds are surface-functionalised detonation nanodiamonds.

28. The sliding layer according to claim 24, wherein the one layer is a middle layer and the another layer is an outer layer, and wherein the second percentage by weight of the surface-functionalised nanodiamonds in the middle layer is higher than the first percentage by weight of the surface-functionalised nanodiamonds in the outer layer.

29. An engine comprising:
   a bearing element, the bearing element including:
      a bearing element substrate; and
      a sliding layer of a sliding layer material;
      the sliding layer material including a polymeric material and surface-functionalised nanodiamonds;
      wherein the sliding layer includes at least two layers with the surface-functionalised nanodiamonds, with one of the at least two layers having a first percentage by weight of the surface-functionalised nanodiamonds, and another of the at least two layers having a second percentage by weight of the surface-functionalised nanodiamonds that is different from the first percentage.

30. The engine according to claim 29, wherein the one layer is a middle layer and the another layer is an outer layer, and wherein the second percentage by weight of the surface-functionalised nanodiamonds in the middle layer is higher than the first percentage by weight of the surface-functionalised nanodiamonds in the outer layer.

31. A method of manufacturing a bearing element, comprising:
   providing a bearing element substrate; and
   applying a sliding layer, having a sliding layer material, to the bearing element substrate;
   wherein the sliding layer material includes a polymeric material and surface-functionalised nanodiamonds; and
   wherein the sliding layer includes at least two layers with the surface-functionalised nanodiamonds, with one of the at least two layers having a first percentage by weight of the surface-functionalised nanodiamonds, and another of the at least two layers having second percentage by weight of the surface-functionalised nanodiamonds that is different from the first percentage.

32. The method according to claim 31, wherein the one layer is a middle layer and the another layer is an outer layer, and wherein the second percentage by weight of the surface-functionalised nanodiamonds in the middle layer is higher than the first percentage by weight of the surface-functionalised nanodiamonds in the outer layer.

* * * * *